(12) United States Patent
Chae et al.

(10) Patent No.: US 12,548,622 B2
(45) Date of Patent: Feb. 10, 2026

(54) NON-VOLATILE MEMORY DEVICES INCLUDING TWISTED BLOCK SELECT LINES

(71) Applicant: SAMSUNG ELECTRONICS CO., LTD., Suwon-si (KR)

(72) Inventors: Seokhyeon Chae, Suwon-si (KR); Hyunkook Park, Suwon-si (KR); Inmo Kim, Suwon-si (KR); Hanmin Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 18/653,627

(22) Filed: May 2, 2024

(65) Prior Publication Data

US 2024/0379162 A1    Nov. 14, 2024

(30) Foreign Application Priority Data

May 9, 2023 (KR) .................. 10-2023-0059905
Jul. 27, 2023 (KR) .................. 10-2023-0098363

(51) Int. Cl.
| | | |
|---|---|---|
| *G11C 7/14* | (2006.01) | |
| *G11C 5/06* | (2006.01) | |
| *G11C 16/04* | (2006.01) | |
| *G11C 16/08* | (2006.01) | |

(52) U.S. Cl.
CPC .............. *G11C 16/08* (2013.01); *G11C 5/063* (2013.01); *G11C 16/0483* (2013.01)

(58) Field of Classification Search
CPC ....................................................... G11C 7/14
See application file for complete search history.

(56) References Cited

U.S. PATENT DOCUMENTS

| | | | |
|---|---|---|---|
| 6,111,774 | A | 8/2000 | Shirley |
| 7,692,991 | B2 | 4/2010 | Koshita |
| 7,804,700 | B2 | 9/2010 | Yamada et al. |
| 8,264,900 | B2 | 9/2012 | Lin et al. |
| 8,830,785 | B2 | 9/2014 | Shim et al. |
| 2019/0171381 | A1* | 6/2019 | Ioannou ................ G06F 3/0679 |

FOREIGN PATENT DOCUMENTS

| | | |
|---|---|---|
| KR | 19990085673 A | 12/1999 |
| KR | 101053657 B1 | 8/2011 |
| KR | 101883012 B1 | 8/2018 |

* cited by examiner

*Primary Examiner* — Jason Lappas
(74) *Attorney, Agent, or Firm* — Wolf, Greenfield & Sacks, P.C.

(57) ABSTRACT

According to some embodiments of the inventive concept, there is provided a non-volatile memory device comprising: a memory cell array; a pass transistor circuit electrically connected to the memory cell array; a block select line group including a plurality of block select lines, wherein the plurality of block select lines comprises a first block select line and a second block select line, each of which extends in a first direction on a first layer, and the block select line group is electrically connected to the pass transistor circuit; and a first metal line extending in a second direction on a second layer, wherein the second layer is on the first layer, wherein at least one block select line includes at least one twist pattern that changes a path of the at least one block select line in a hole of the first metal line.

20 Claims, 14 Drawing Sheets

FIG. 4B

| Couple | BLKWL1 | BLKWL2 | BLKWL3 | BLKWL4 |
|---|---|---|---|---|
| BLKWL1 | 0% | 33% | 33% | 33% |
| BLKWL2 | 33% | 0% | 33% | 33% |
| BLKWL3 | 33% | 33% | 0% | 33% |
| BLKWL4 | 33% | 33% | 33% | 0% |

FIG. 5B

| Couple | BLKWL1 | BLKWL2 | BLKWL3 | BLKWL4 |
|---|---|---|---|---|
| BLKWL1 | 0% | 50% | 50% | 50% |
| BLKWL2 | 50% | 0% | 50% | 50% |
| BLKWL3 | 50% | 50% | 0% | 50% |
| BLKWL4 | 50% | 50% | 50% | 0% |

FIG. 5C

| Couple | BLKWL NUMBER | | | | | | |
|---|---|---|---|---|---|---|---|
| | 2 | 3 | 4 | 5 | 6 | 7 | 8 |
| FIRST COUPLE | 200 | 400 | 600 | 800 | 1000 | 1200 | 1400 |
| SECOND COUPLE | 100 | 133.3333 | 150 | 160 | 166.6667 | 171.4286 | 175 |
| THIRD COUPLE | 100 | 66.66667 | 50 | 40 | 33.33333 | 28.57143 | 25 |

NON-VOLATILE MEMORY DEVICES INCLUDING TWISTED BLOCK SELECT LINES

CROSS-REFERENCE TO RELATED APPLICATION

This application is based on and claims priority under 35 U.S.C. § 119 to Korean Patent Application Nos. 10-2023-0059905, filed on May 9, 2023 and 10-2023-0098363, filed on Jul. 27, 2023 in the Korean Intellectual Property Office, the disclosure of which is incorporated by reference herein in their entirety.

BACKGROUND

The inventive concepts of the present disclosures relate to layouts of non-volatile memory device. Non-volatile memory devices may need chip size reduction technology of minimizing metal usage for competitiveness improvement. Accordingly, arrangement methods of block select lines for reducing the chip sizes of non-volatile memory devices may be needed.

In addition, the degree of integration of non-volatile memory devices has gradually increased, and accordingly, capacitance between metal wirings including block select lines and between the metal wirings and a semiconductor substrate has increased. The increase in the capacitance may reduce the reliability of a program operation, a read operation, and an erase operation on a selected memory cell block. Accordingly, there is a need for a method of reducing the chip size and not reducing the reliability of the above-described operations.

SUMMARY

The inventive concepts of the present disclosures may provide arrangement methods of block select lines of non-volatile memory devices.

According to some embodiments of the inventive concepts of the present disclosures, there is provided a non-volatile memory device comprising: a memory cell array; a pass transistor circuit that is electrically connected to the memory cell array; a block select line group that includes a plurality of block select lines, wherein the plurality of block select lines comprises a first block select line and a second block select line, each of which extends in a first direction on a first layer, and the block select line group is electrically connected to the pass transistor circuit; and a first metal line that extends in a second direction on a second layer, wherein the second layer is on the first layer, wherein the first direction intersects the second direction, and wherein at least one block select line among the plurality of block select lines includes at least one twist pattern that changes a path of the at least one block select line in a hole of the first metal line in a plan view.

According to some embodiments of the inventive concepts of the present disclosures, there is provided a non-volatile memory device comprising: a memory cell array that includes a plurality of memory blocks; a pass transistor circuit that is electrically connected to the plurality of memory blocks; a block decoder that is configured to provide a block select signal to the pass transistor circuit via a block select line group that includes a plurality of block select lines, wherein the plurality of block select lines comprises a first block select line and a second block select line, each of which extends in a first direction on a first layer; a control logic circuit that is configured to control the memory cell array and the block decoder; and a first metal line that extends in a second direction on a second layer, wherein the second layer is on the first layer, wherein the first direction intersects the second direction, wherein at least one block select line among the plurality of block select lines includes at least one twist pattern that changes a path of the at least one block select line in a hole of the first metal line in a plan view, and wherein a first portion of the first block select line and a second portion of the second block select line are adjacent to each other.

According to some embodiments of the inventive concepts of the present disclosures, there is provided a non-volatile memory device comprising: a memory cell array; a pass transistor circuit that is electrically connected to the memory cell array; a first block select line group that includes a first block select line and a second block select line, each of which extends in a first direction on a first layer; and a second block select line group that includes a third block select line and a fourth block select line, each of which extends in the first direction on the first layer, wherein the first block select line group and the second block select line group are electrically connected to the pass transistor circuit, wherein at least one block select line among the first block select line group and the second block select line group includes at least one twist pattern that changes a path of the at least one block select line, wherein a first portion of the first block select line and a second portion of the second block select line are adjacent to each other, and wherein a third portion of the third block select line and a fourth portion of the fourth block select line are adjacent to each other.

BRIEF DESCRIPTION OF THE DRAWINGS

Embodiments will be more clearly understood from the following detailed description taken in conjunction with the accompanying drawings in which:

FIG. 4B illustrates coupling ratios between block select lines of the embodiment of FIG. 4A;

FIG. 5B is a table of coupling ratios between block select lines related to the embodiment of FIG. 5A;

FIG. 5C is a table of coupling capacitance ratios according to the number of block select lines;

DETAILED DESCRIPTION

Hereinafter, embodiments of the inventive concepts of the present disclosures are described in detail with reference to the accompanying drawings.

Figure 1:
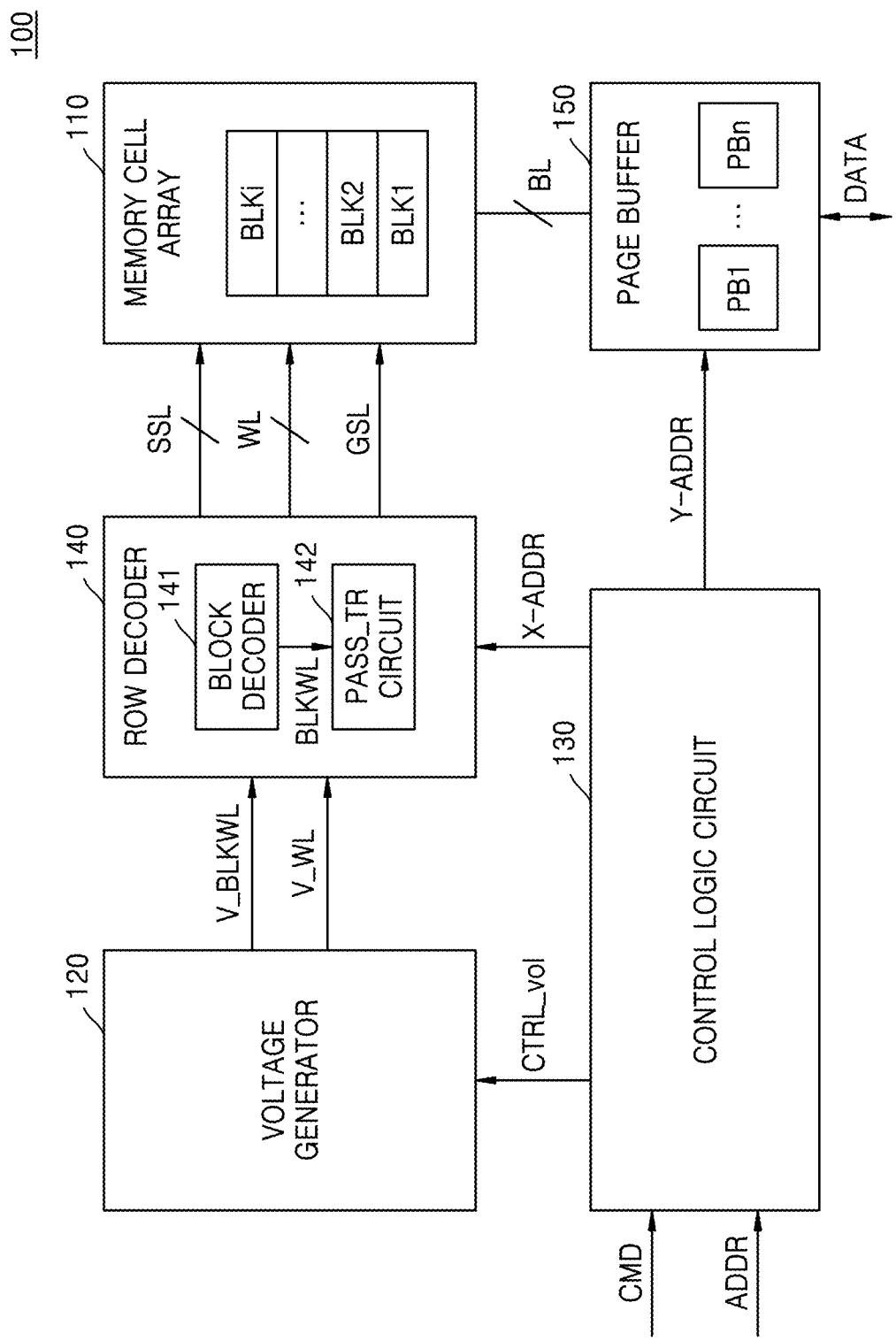
FIG. 1 is a block diagram of a memory device according to some embodiments.

FIG. 1 is a block diagram of a memory device 100 according to some embodiments.

Referring to FIG. 1, the memory device 100 may include a memory cell array 110, a voltage generator 120, a control logic circuit 130, a row decoder 140, and a page buffer 150. Although not illustrated, the memory device 100 may further include an interface circuit, and the interface circuit may include a data input/output circuit, a command/address input/output circuit, etc. In addition, the memory device 100 may further include a column logic, a pre-decoder, a temperature sensor, a command decoder, an address decoder, etc.

The memory cell array 110 may include a plurality of memory blocks BLK1 through BLKi, where i is a positive integer. Each of the plurality of memory blocks BLK1 through BLKi may include a plurality of pages, and each of the plurality of pages may include a plurality of memory cells. For example, a memory block of the plurality of memory blocks BLK1 through BLKi may be a unit of erase, and a page may be a unit of write and read. Each memory cell may store one or more bits, and in detail, each memory cell may be used as a single level cell (SLC), a multi-level cell (MLC), a triple level cell (TLC), or a quadruple level cell (QLC). The memory cell array 110 may be connected (e.g., electrically connected) to the page buffer 150 via bit lines BL, and may be connected (e.g., electrically connected) to a row decoder 140 via word lines WL, string select lines SSL, and ground select lines GSL. It will be understood that when an element or layer is referred to as being "connected to", or "coupled to" another element or layer, it may be directly on, connected to, or coupled to the other element or layer, or one or more intervening elements or layers may be present. In contrast, when an element is referred to as being "directly coupled," "directly connected," or "directly responsive" to, or "directly on," another element, there are no intervening elements present. In addition, "electrical connection" conceptually includes a physical connection and a physical disconnection. In addition, it will also be understood that when an element or layer is referred to as being "between" two elements or layers, it may be the only element or layer between the two elements or layers, or one or more intervening elements or layers may also be present.

In some embodiments, the memory cell array 110 may include a three-dimensional (3D) memory cell array, and the 3D memory cell array may include a plurality of cell strings. Each cell string may include memory cells respectively connected (e.g., electrically connected) to the word lines WL vertically stacked on a substrate. U.S. Pat. Nos. 7,679,133, 8,553,466, 8,654,587, 8,559,235, and U.S. Patent Application Publication No. 2011/0233648 are incorporated in their entirety herein by reference. In some embodiments, the memory cell array 110 may include a two-dimensional (2D) memory cell array, and the 2D memory cell array may include a plurality of NAND strings arranged in directions of rows and columns.

The control logic circuit 130 may control various operations in the memory device 100. The control logic circuit 130 may output various control signals in response to a command CMD and/or an address ADDR from a memory interface circuit (e.g., from an external circuit), to at least one of the voltage generator 120, the row decoder 140, and the page buffer 150. For example, the control logic circuit 130 may output various control signals to write data to the memory cell array 110 or to read data from the memory cell array 110, to at least one of the voltage generator 120, the row decoder 140, and the page buffer 150. The control logic circuit 130 may provide a voltage control signal CTRL_vol to the voltage generator 120, a row address X-ADDR to the row decoder 140, and a column address Y-ADDR to the page buffer 150. However, the inventive concepts of the present disclosures are not limited thereto, and the control logic circuit 130 may further provide other control signals to the voltage generator 120, the row decoder 140, and the page buffer 150. As used hereinafter, the terms "external/outside circuit", "external/outside configuration", "external/outside device", "external/outside power", "external/outside signal", or "outside" are intended to broadly refer to a device, circuit, block, module, power, and/or signal that resides externally (e.g., outside of a functional or physical boundary) with respect to a given circuit, block, module, system, or device.

The voltage generator 120 may generate various types of voltages for performing program, read, and erase operations based on the voltage control signal CTRL_vol. The voltage generator 120 may generate row line voltages applied to row lines, that is, a string select line voltage, a word line voltage V_WL, a block select line voltage V_BLKWL, and a ground select line voltage. The voltage generator 120 may provide, to the row decoder 140, the string select line voltage, the word line voltage V_WL, the block select line voltage V_BLKWL, and the ground select line voltage, which have been generated.

For example, the voltage generator 120 may generate, as the word line voltage V_WL, a program voltage, a read voltage, a program verification voltage, an erase voltage, etc. For example, the voltage generator 120 may generate, as the block select line voltage V_BLKWL, a select voltage and a non-select voltage. For example, the voltage generator 120 may generate, as the string select line voltage, a select voltage and a non-select voltage. For example, the voltage generator 120 may generate, as the ground select line voltage, a select voltage and a non-select voltage. In addition, the voltage generator 120 may further generate a bit line voltage, a common source line voltage, etc.

The row decoder 140 may select one of a plurality of word lines WL in response to the row address X-ADDR, and may select one of a plurality of string select lines SSL. The row decoder 140 may select at least one of a plurality of block select lines BLKWL in response to the row address X-ADDR. For example, during the program operation, the row decoder 140 may apply the program voltage and the program verification voltage to the selected word line WL, and during the read operation, may apply the read voltage to the selected word line WL.

The row decoder 140 may include a block decoder 141 and a pass transistor circuit (PASS_TR CIRCUIT) 142. The block decoder 141 may provide a block select signal to the PASS_TR CIRCUIT 142 via the block select line BLKWL. The memory device 100 may perform an erase operation on the memory block BLKi selected from among the plurality of memory blocks BLK1 through BLKi based on the block select signal.

The page buffer 150 may select at least one bit line BL from among the plurality of bit lines BL in response to a column address Y-ADDR. The page buffer 150 may operate as a write driver or a sense amplifier depending on an operation mode. The page buffer 150 may include a plurality of page buffers PB1 through PBn, where n is a positive integer. For example, n may correspond to the number of bit lines BL, and the plurality of page buffers PB1 through PBn may be respectively connected (e.g., electrically connected) to the plurality of bit lines BL. For example, during a program operation, the page buffer 150 may apply a bit line voltage corresponding to data to be programmed to the selected bit line BL. During a read operation, the page buffer 150 may sense data stored in a memory cell by sensing a current or a voltage of the selected bit line BL.

The memory device 100 according to some embodiments may include the memory cell array 110 including the plurality of memory blocks BLK1 through BLKi, the PASS_TR CIRCUIT 142 connected (e.g., electrically connected) to the plurality of memory blocks BLK1 through BLKi, and the block decoder 141 providing a block select signal to the PASS_TR CIRCUIT 142 via a block select line group including the plurality of block select lines BLKWL that includes, for example, a first block select line and a second block select line, which respectively extend in a first direction (e.g., X-direction) on a first layer. In addition, the memory device 100 may include the control logic circuit 130 controlling the memory cell array 110 and the block decoder 141. A first path, on which the first block select line extends, and a second path, on which the second block select line extends, may be adjacent to each other. The memory device 100 may further include a first metal line (700 in FIG. 7A) extending in a second direction (e.g., Y-direction) on a second layer. The first metal line 700 may include a common source line CSL (702, 703, and 704 in FIG. 8). At least one block select line among the plurality of block select lines BLKWL may include at least one twist pattern which changes a path of the at least one block select line in a hole (701 in FIG. 7A) of the first metal line 700 in a plan view. For example, the at least one twist pattern may change a path of the first block select line (e.g., from the first path) to the second path on the first layer, and may change a path of the second block select line (e.g., from the second path) to the first path on the second layer. In other words, the path of the first block select line may change on the first layer, and the path of the second block select line may change on the second layer, but the embodiments are not limited thereto. A path change is described in detail below with reference to FIG. 9. The memory device 100 may further include shields (801, 802, and 803 in FIG. 7A) for preventing coupling between the first metal line 700 and the at least one block select line on the second layer. On the other hand, the block select line group may further include a third block select line extending in the first direction. The second block select line may be between the first block select line and the third block select line. As an example, the at least one twist pattern may change the path of the first block select line (e.g., from the first path) to a third path formed by extending the third block select line on the first layer, and may change the path of the third block select line (e.g., from the third path) to the first path on the second layer. In other words, the path of the first block select line may change on the first layer, and the path of the third block select line may change on the second layer, but the embodiments are not limited thereto. A metal of the third block select line on the second layer may include the same metal as a metal of the first metal line 700. In some embodiments, the second path and the third path may be adjacent to each other. In some embodiments, the memory device 100 may further include a second metal line (for example, a block select line shield 602 in FIG. 4A) between the second block select line and the third block select line for reducing (e.g., preventing) the coupling between the third block select line and the second block select line.

The second metal line may extend in the first direction on the first layer.

The memory device 100 according to some embodiments may include the first block select line group, the second block select line group, and the common source line CSL. The first block select line group may include the first block select line and the second block select line, which respectively extend in the first direction on the first layer. The second block select line group may include the third block select line and a fourth block select line, which respectively extend in the first direction on the first layer. The common source line CSL may extend in the second direction on the second layer that is disposed on (e.g., above) the first layer. At least one block select line among the first block select line group and the second block select line group (e.g., the first block select line, the second block select line, the third block select line, and/or the fourth block select line) may include at least one twist pattern which changes a path of the at least one block select line in the hole of the common select line CSL in a plan view. The first path, on which the first block select line extends, and the second path, on which the second block select line extends, may be adjacent to each other. The third path, on which the third block select line extends, and a fourth path, on which a fourth block select line extends, may be adjacent to each other. As an example, the at least one twist pattern may change the path of the first block select line (e.g., from the first path) to the fourth path on the first layer, and may change the path of the fourth block select line (e.g., from the fourth path) to the first path. In this case, on the second layer, a metal of the fourth block select line may include the same metal as the metal of the common select line CSL, and the first block select line group and the second block select line group may be adjacent to each other. In some embodiments, the memory device 100 may further include a shield line for preventing the coupling between the first block select line group and the second block select line group. The shield line may extend in the first direction on the first layer.

The memory device 100 according to some embodiments may improve the coupling between the block select lines BLKWL. Accordingly, the memory device 100 may reduce (e.g., prevent) the case in which an unselected block is selected. In addition, because the memory device 100 may not include (e.g., may reduce) a shield for preventing the coupling between the block select lines BLKWL, the amount of metal for the shield may be reduced. In addition, as the amount of metal decreases, the chip size of the memory device 100 may be reduced.

Figure 2:
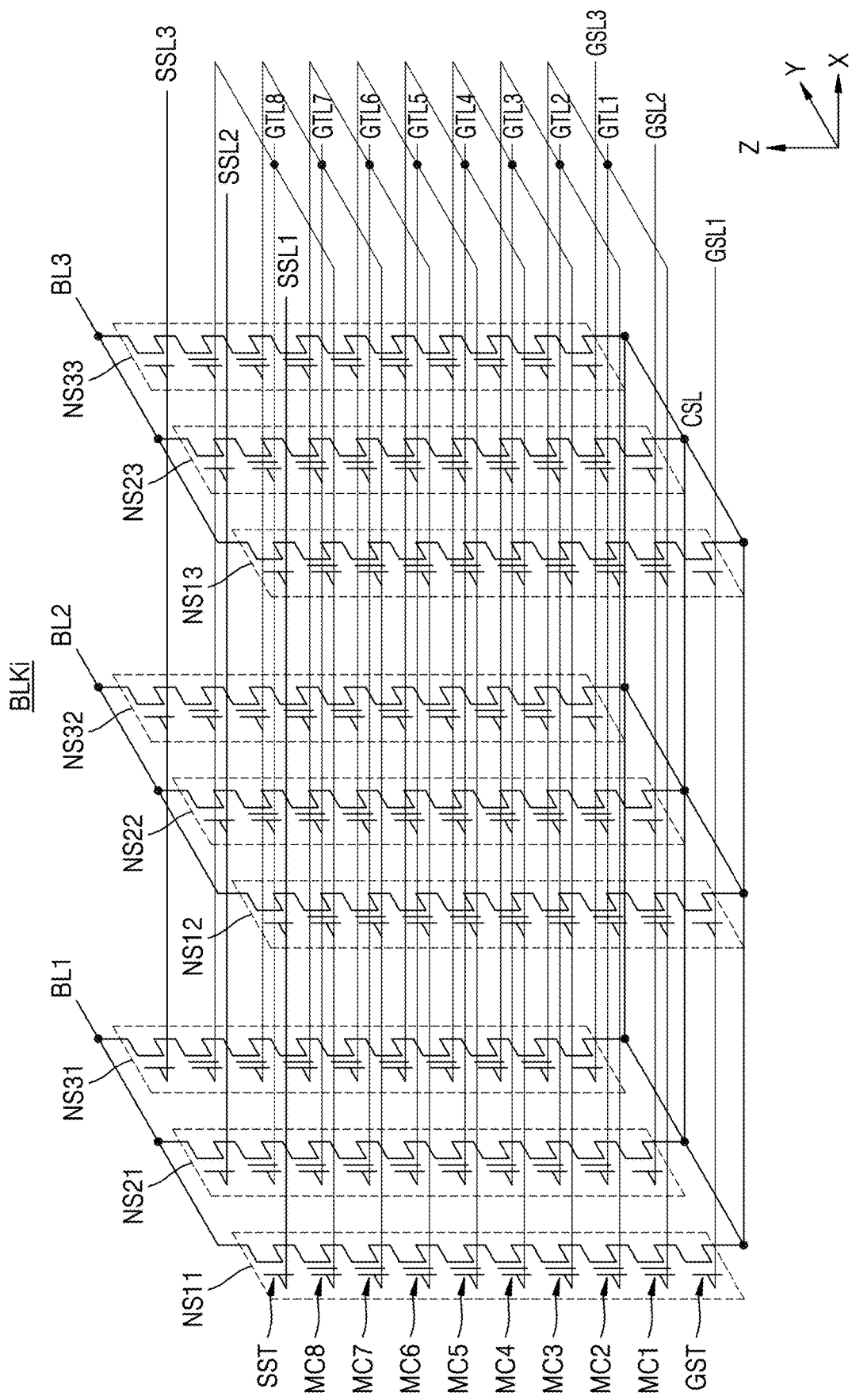
FIG. 2 is a circuit diagram of a memory block according to some embodiments.

FIG. 2 is a circuit diagram of the memory block BLKi according to some embodiments.

Referring to FIG. 2, the memory block BLKi may correspond to one of the plurality of memory blocks BLK1 through BLKi in FIG. 1. The memory block BLKi in FIG. 2 may represent a 3D memory block formed in a 3D structure on a substrate. For example, a plurality of memory NAND strings included in the memory block BLKi may be formed in a direction vertical (referred to as a third direction or Z-direction) to the substrate.

Referring to FIG. 2, the memory block BLKi may include a plurality of memory NAND strings NS11 through NS33 (NS11, NS12, NS13, NS21, NS22, NS23, NS31, NS32, and NS33) connected (e.g., electrically connected) between bit lines BL1, BL2, and BL3 and the common source line CSL. Each of the plurality of NAND strings NS11 through NS33 may include a string select transistor SST, a plurality of memory cells MC1 through MC8, and a ground select transistor GST. It is illustrated in FIG. 2 that each of the plurality of memory NAND strings NS11 through NS33 includes eight memory cells MC1 through MC8, but the embodiment is not limited thereto.

The string select transistor SST may be connected (e.g., electrically connected) to string select lines SSL1 through SSL3. The plurality of memory cells MC1 through MC8 may be respectively connected (e.g., electrically connected) to corresponding gate lines GTL1 through GTL8. The gate lines GTL1 through GTL8 may correspond to word lines WL. In some embodiments, some of the gate lines GTL1 through GTL8 may correspond to a dummy word line WL. The ground select transistor GST may be respectively connected (e.g., electrically connected) to a corresponding one of the ground select lines GSL1 through GSL3. The string select transistor SST may be connected (e.g., electrically connected) to a corresponding one of the bit lines BL1 through BL3, and the ground select transistor GST may be connected (e.g., electrically connected) to the common source line CSL.

Word lines of the same height (for example, GTL1) may be commonly connected (e.g., electrically connected) to each other, and the ground select lines GSL1 through GSL3 may be respectively separated from the string select lines SSL1 through SSL3. It is illustrated in FIG. 2 that the memory block BLKi is connected (e.g., electrically connected) to eight gate lines GTL1 through GTL8 and three bit lines BL1 through BL3, but the embodiment is not limited thereto.

Figure 3:
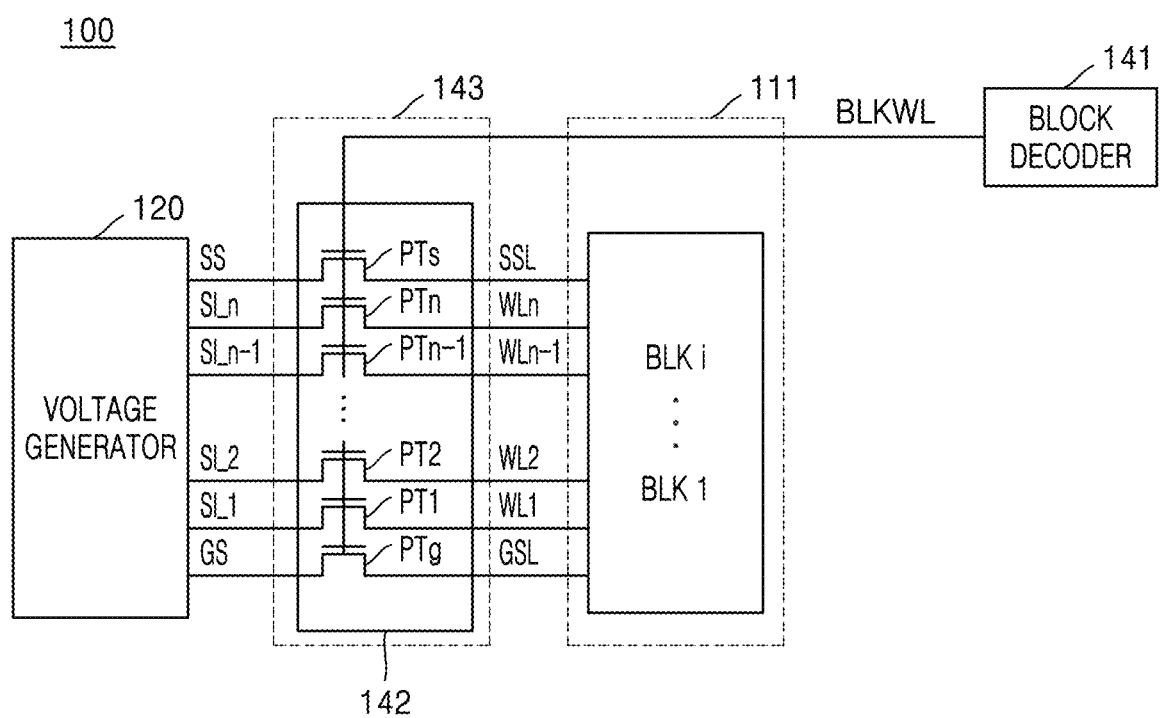
FIG. 3 is a block diagram of a memory device according to some embodiments.

FIG. 3 is a block diagram of a memory device 100 according to some embodiments. FIG. 3 is described with reference to FIGS. 1 and 2.

Referring to FIG. 3, the memory device 100 may include the voltage generator 120, the block decoder 141, the PASS_TR CIRCUIT 142, and the plurality of memory blocks BLK1 through BLKi.

The block decoder 141 may provide a block select signal to the PASS_TR CIRCUIT 142 via the block select line BLKWL in the block select line group. The block select line group may include the plurality of block select lines BLKWL. It is illustrated in FIG. 3 that there is one memory block BLKi and one block select line BLKWL for convenience of description, but the block decoder 141 may select the plurality of memory blocks BLK1 through BLKi via the block select line group including the plurality of block select lines BLKWL.

The block select signal may turn on a plurality of pass transistors PTs, PT1 through PTn, and PTg, and accordingly, the memory block BLKi may be selected. Although it is illustrated that one block select line BLKWL is commonly connected (e.g., electrically connected) to the plurality of pass transistors PTs, PT1 through PTn, and PTg, the embodiment is not limited thereto. In some embodiments, at least two of the plurality of pass transistors PTs, PT1 through PTn, and PTg may be respectively connected (e.g., electrically connected) to two or more block select lines BLKWL among the plurality of block select lines BLKWL. The memory device 100 may perform an erase operation on the memory block BLKi selected based on the block select signal.

The voltage generator 120 may be connected (e.g., electrically connected) to the PASS_TR CIRCUIT 142 via a string select line driving signal line SS, word line driving signal lines SI_1 through SI_n, and a ground select line driving signal line GS. The string select line driving signal line SS, the word line driving signal lines SI_1 through SI_n, and the ground select line driving signal line GS may be respectively connected (e.g., electrically connected) to ends of the plurality of pass transistors PTs, PT1 through PTn, and PTg in the PASS_TR CIRCUIT 142. The number of driving signal lines is not limited thereto, and may vary.

The PASS_TR CIRCUIT 142 may be connected (e.g., electrically connected) to the memory block BLKi via the string select line SSL, the plurality of word lines WL1 through WLn, and the ground selection line GSL. When the block select signal is activated, the plurality of pass transistors PTs, PT1 through PTn, and PTg may provide driving signals provided via the string select line driving signal line SS, the word line driving signal lines SI_1 through SI_n, and the ground select line driving signal line GS to the string select lines SSL, the plurality of word lines WL1 through WLn, and the ground select line GSL, respectively.

The block select line BLKWL may (electrically and/or physically) extend in (e.g., pass through) at least one of a first region 143 of the PASS_TR CIRCUIT 142 and a second region 111 of the memory cell array 110. The first region 143 of the PASS_TR CIRCUIT 142 may mean a region adjacent to the PASS_TR CIRCUIT 142. For example, the first region 143 may include an upper region and/or a lower region adjacent to the PASS_TR CIRCUIT 142. The second region 111 of the memory cell array 110 may mean a region adjacent to the memory cell array 110. For example, the second region 111 may include an upper region and/or a lower region adjacent to the memory cell array 110.

Figure 4A:
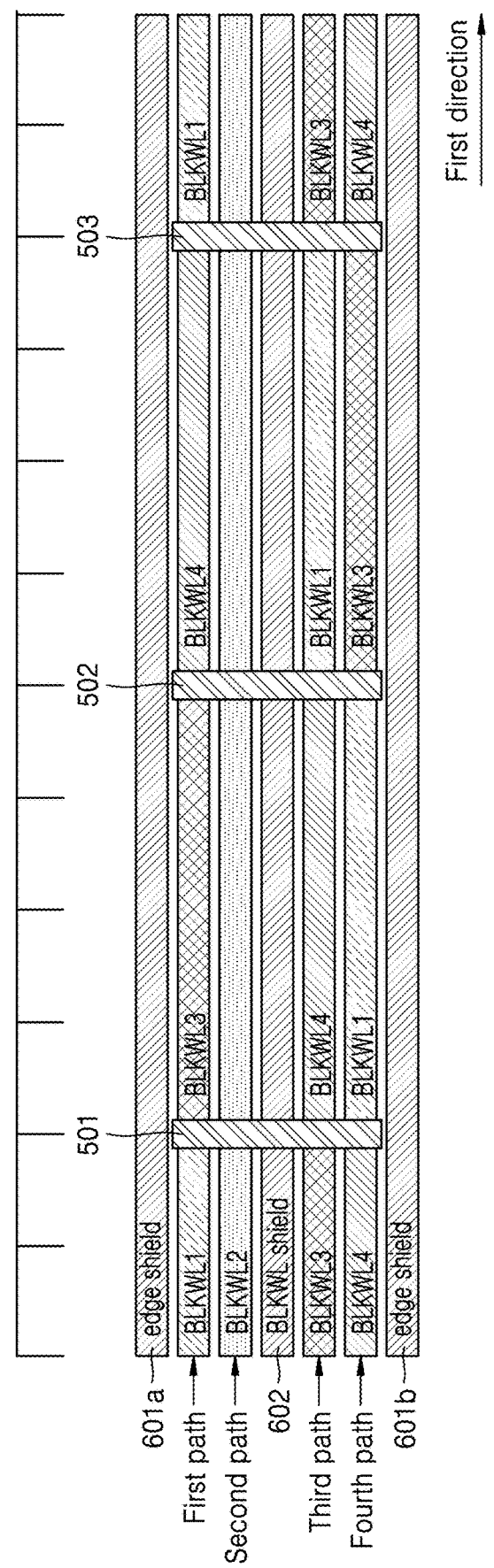
FIG. 4A illustrates twists of block select lines according to some embodiments.

FIG. 4A illustrates twists of block select lines BLKWL1 through BLKWL4 according to some embodiments.

Referring to FIG. 4, the block select line group may include the block select lines BLKWL1 through BLKWL4. The block select line group may include various number of block select lines, and is not limited thereto.

An edge shield 601a may reduce (e.g., block) coupling between the "block select line BLKWL1" and an "external wiring or external device". An edge shield 601b may reduce (e.g., block) coupling between the "block select line BLKWL4" and an "external wiring or external device". The coupling may mean mutual influences. For example, the coupling may mean coupling capacitance.

A block select line shield 602 may reduce (e.g., block) coupling between the block select line BLKWL2 and the block select line BLKWL3. On the other hand, the first block select line group may include the block select lines BLKWL1 and BLKWL2, and the second block select line group may include block select lines BLKWL3 and BLKWL4. Accordingly, the block select line shield 602 may reduce (e.g., block) coupling between the first block select line group and the second block select line group (e.g., between the block select line BLKWL2 and the block select line BLKWL3).

Each of the block select lines BLKWL1 through BLKWL4 may extend in the first direction on the first layer. A path, on which the block select line BLKWL1 extends (before the path change in twist regions 501, 502, and 503), may be referred to as the first path. A path, on which the block select line BLKWL2 extends (before the path change in twist regions 501, 502, and 503), may be referred to as the second path. A path, on which the block select line BLKWL3 extends (before the path change in twist regions 501, 502, and 503), may be referred to as the third path. A path, on which the block select line BLKWL4 extends (before the path change in twist regions 501, 502, and 503), may be referred to as the fourth path. In twist regions 501, 502, and 503, the paths of the block select lines BLKWL1 through BLKWL4 may be changed.

Referring to FIG. 4A, the first path and the second path may be adjacent to each other. In other words, the block select line shield 602 may not be arranged between the first path and the second path, and accordingly, the coupling may occur between a block select line extending on the first path and a block select line extending on the second path. In addition, the third path and the fourth path may be adjacent to each other. Accordingly, the coupling may occur between a block select line extending on the third path and a block select line extending on the fourth path.

Referring to FIG. 4A, in the twist region 501, a path of the block select line BLKWL1 may be changed from the first path to the fourth path, a path of the block select line BLKWL3 may be changed from the third path to the first path, and a path of the block select line BLKWL4 may be changed from the fourth path to the third path. A path of the block select line BLKWL2 (the second path) may not be changed in the twist region 501. The path of each of the block select lines BLKWL1 through BLKWL4 may be maintained or changed in the twist region 501, and a combination thereof is not limited the embodiment described above, but may vary.

In the twist region 502, the path of the block select line BLKWL1 may be changed from the fourth path to the third path, the path of the block select line BLKWL4 may be changed from the third path to the first path, and the path of the block select line BLKWL3 may be changed from the first path to the fourth path. The path of the block select line BLKWL2 (the second path) may not be changed in the twist region 502. The path of each of the block select lines BLKWL1 through BLKWL4 may be maintained or changed in the twist region 502, and a combination thereof is not limited the embodiment described above, but may vary.

In the twist region 503, the path of the block select line BLKWL4 may be changed from the first path to the fourth path, the path of the block select line BLKWL1 may be changed from the third path to the first path, and the path of the block select line BLKWL3 may be changed from the fourth path to the third path. The path of the block select line BLKWL2 (the second path) may not be changed in the twist region 503. The path of each of the block select lines BLKWL1 through BLKWL4 may be maintained or changed in the twist region 503, and a combination thereof is not limited the embodiment described above, but may vary.

The number of twist regions 501, 502, and 503 may be properly determined based on the number of block select lines, the number of block select line shields, locations of the twist regions, or the like, and is not limited the embodiment described above.

FIG. 4B illustrates coupling ratios between block select lines BLKWL1 through BLKWL4 of the embodiment of FIG. 4A.

Referring to FIG. 4B, the coupling ratio between the block select line BLKWL1 and each of the remaining block select lines BLKWL2 through BLKWL4 may be about 33%. The coupling ratio between the block select line BLKWL2 and each of the remaining block select lines BLKWL1, BLKWL3, and BLKWL4 may be about 33%. The coupling ratio between the block select line BLKWL3 and each of the remaining block select lines BLKWL1, BLKWL2, and BLKWL4 may be about 33%. The coupling ratio between the block select line BLKWL4 and each of the remaining block select lines BLKWL1 through BLKWL3 may be about 33%. In other words, the coupling ratios between each of the block select lines BLKWL1 through BLKWL4 may be equally adjusted. As locations where the block select lines BLKWL1 through BLKWL4 are twisted and the number of twists are adjusted, adjacent lengths between each of the block select lines BLKWL1 through BLKWL4 may be adjusted. Accordingly, the coupling ratio of each block select line may be adjusted.

On the other hand, when the block select line BLKWL1 and the block select line BLKWL2 are adjacent to each other without the block select line shield 602 therebetween, and there is no twisting, the coupling ratio of the block select line BLKWL1 with respect to the block select line BLKWL2 may be about 100%. In addition, when the block select line BLKWL3 and the block select line BLKWL4 are adjacent to each other without the block select line shield 602 therebetween, and there is no twisting, the coupling ratio of the block select line BLKWL3 with respect to the block select line BLKWL4 may be about 100%.

In other words, the memory device 100 according to some embodiments may distribute the coupling of each block select line by changing paths of the block select lines BLKWL1 through BLKWL4 in the twist regions 501, 502, and 503. For example, the memory device 100 may distribute the coupling of each block select line by equally adjusting the adjacent lengths of the block select lines BLKWL1 through BLKWL4.

The memory device 100 according to some embodiments may improve (e.g., reduce) the coupling of the block select lines BLKWL1 through BLKWL4 by "using a shield for coupling prevention between the block select line BLKWL1 and the block select line BLKWL2" and by "not using a shield for coupling prevention between the block select line BLKWL3 and the block select line BLKWL4". However, the embodiments of the inventive concepts of the present disclosures are not limited thereto. The memory device 100 may improve (e.g., reduce) the coupling between the block select lines BLKWL1 through BLKWL4 by the twist regions 501, 502, and 503.

Accordingly, the memory device 100 may reduce (e.g., prevent) the case in which an unselected block is selected. In addition, the memory device 100 may decrease the amount of the metal used for the shields by using the twist regions (e.g., the twist regions 501, 502, and 503). For example, because the memory device 100 in FIG. 4A does not include the shield for coupling prevention between the block select line BLKWL1 and the block select line BLKWL2 and the shield for coupling prevention between the block select line BLKWL3 and the block select line BLKWL4, the amount of a metal used for the shields may be reduced. In addition, as the amount of the metal used decreases, the chip size of the memory device 100 may be reduced.

Figure 5A:
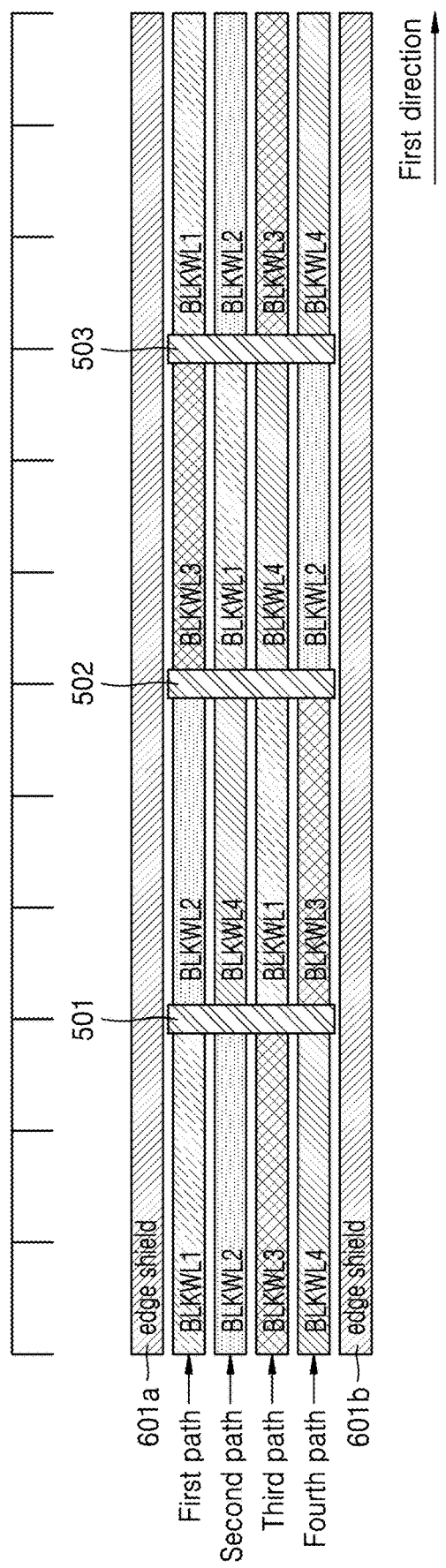
FIG. 5A illustrates twists of block select lines according to some embodiments.

FIG. 5A illustrates twists of the block select lines BLKWL1 through BLKWL4 according to some embodiments. FIG. 5A may be described with reference to FIG. 4A, and duplicate descriptions thereof may be omitted.

Referring to FIG. 5A, the block select line group may include the block select lines BLKWL1 through BLKWL4. The block select line group may include various number of block select lines, and is not limited thereto.

Compared to the embodiment of FIG. 4A, the block select line group in FIG. 5A may not include the block select line shield 602 in FIG. 4A. The first block select line group may include the block select lines BLKWL1 and BLKWL2, and the second block select line group may include block select lines BLKWL3 and BLKWL4. Accordingly, the block select line group in FIG. 5A may not include the block select line shield 602 which reduces (e.g., blocks) the coupling between the first block select line group and the second block select line group.

Referring to FIG. 5A, in the twist region 501, the path of the block select line BLKWL1 may be changed from the first path to the third path, the path of the block select line BLKWL2 may be changed from the second path to the first path, the path of the block select line BLKWL3 may be changed from the third path to the fourth, and the path of the block select line BLKWL4 may be changed from the fourth path to the second path. The path of each of the block select lines BLKWL1 through BLKWL4 may be maintained or changed in the twist region 501, and a combination thereof is not limited the embodiment described above, but may vary.

In the twist region 502, the path of the block select line BLKWL1 may be changed from the third path to the second path, the path of the block select line BLKWL2 may be changed from the first path to the fourth path, and the path of the block select line BLKWL3 may be changed from the fourth path to the first path. The path of the block select line BLKWL4 may be changed from the second path to the third path. The path of each of the block select lines BLKWL1 through BLKWL4 may be maintained or changed in the twist region 502, and a combination thereof is not limited the embodiment described above, but may vary.

In the twist region 503, the path of the block select line BLKWL1 may be changed from the second path to the first path, the path of the block select line BLKWL2 may be changed from the fourth path to the second path, and the path of the block select line BLKWL3 may be changed from the first path to the third path. The path of the block select line BLKWL4 may be changed from the third path to the fourth path. The path of each of the block select lines BLKWL1 through BLKWL4 may be maintained or changed in the twist region 503, and a combination thereof is not limited the embodiment described above, but may vary.

The number of twist regions 501, 502, and 503 may be properly determined based on the number of block select lines, the number of block select line shields, locations of the twist regions, or the like, and is not limited the embodiment described above. In addition, referring to FIGS. 5A and 4A, the positions of the twist regions 501, 502, and 503 in FIG. 5A may be different from the positions of the twist regions 501, 502, and 503 in the embodiment of FIG. 4A, and the positions of the twist regions 501, 502, and 503 may be appropriately selected so that the coupling ratios between the block select lines are uniform (e.g., equal or substantially equal to each other).

FIG. 5B is a table of coupling ratios between block select lines related to the embodiment of FIG. 5A. FIG. 5C is a table of coupling capacitance ratios according to the number of block select lines.

Referring to FIG. 5B, the coupling ratio between the block select line BLKWL1 and each of the remaining block select lines BLKWL2 through BLKWL4 may be about 50%. The coupling ratio between the block select line BLKWL2 and each of the remaining block select lines BLKWL1, BLKWL3, and BLKWL4 may be about 50%. The coupling ratio between the block select line BLKWL3 and each of the remaining block select lines BLKWL1, BLKW2, and BLKWL4 may be about 50%. The coupling ratio between the block select line BLKWL4 and each of the remaining block select lines BLKWL1, BLKW2, and BLKWL3 may be about 50%.

On the other hand, when there is no twist, the coupling ratio between the block select line BLKWL1 and the block select line BLKWL2 may be about 100%, the coupling ratio between the block select line BLKWL2 and the block select line BLKWL3 may be about 100%, the coupling ratio between the block select line BLKWL3 and the block select line BLKWL4 may be about 100%.

In other words, in the memory device 100 according to some embodiments, the block select lines BLKWL1 through BLKWL4 may distribute the coupling of each block select line by changing the paths of the block select lines BLKWL1 through BLKWL4 in the twist regions 501, 502, and 503. For example, the memory device 100 may distribute the coupling of each block select line by equally adjusting the adjacent lengths of the block select lines BLKWL1 through BLKWL4.

FIG. 5C illustrates the coupling of n block select lines when the block select line shield (602 in FIG. 4A) is not included, according to some embodiments. n may be an integer of two or more. A first couple may be referred to as a total couple of n block select lines. The first couple may be expressed by Formula 1 below.

$$\text{First couple} = 100*2 + 200*(n-2) \qquad \text{[Formula 1]}$$

A second couple may be referred to as a total couple that is received by one block select line. The second couple may be expressed by Formula 2 below.

$$\text{Second couple} = \text{First couple}/n \qquad \text{[Formula 2]}$$

A third couple may be referred to as a couple that may be equally received by each block select line. The third couple may be expressed by Formula 3 below.

$$\text{Third couple} = \text{Second couple}/(n-1) \qquad \text{[Formula 3]}$$

Figure 6:
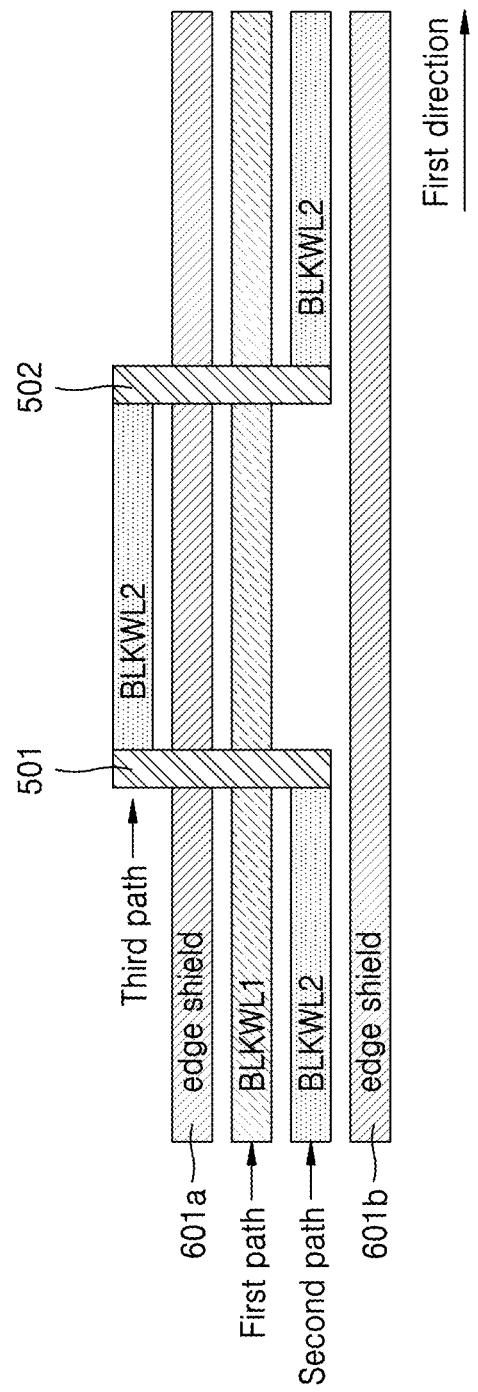
FIG. 6 illustrates twists of block select lines according to some embodiments.

FIG. 6 illustrates twists of the block select lines BLKWL1 and BLKWL2 according to some embodiments.

Referring to FIG. 6, the block select line group may include the block select lines BLKWL1 and BLKWL2. In the twist region 501, the path of the block select line BLKWL1 may not be changed from the first path. In the twist region 501, the path of the block select line BLKWL2 may be changed from the second path to the third path. In this case, the third path may include a path positioned outside the edge shield 601a. The block select line BLKWL2 may extend in the first direction on the changed third path.

In the twist region 502, the path of the block select line BLKWL1 may not be changed from the first path. In the twist region 502, the path of the block select line BLKWL2 may be changed from the third path to the second path. The block select line BLKWL2 may extend again in the first direction on the second path.

Figure 7A:
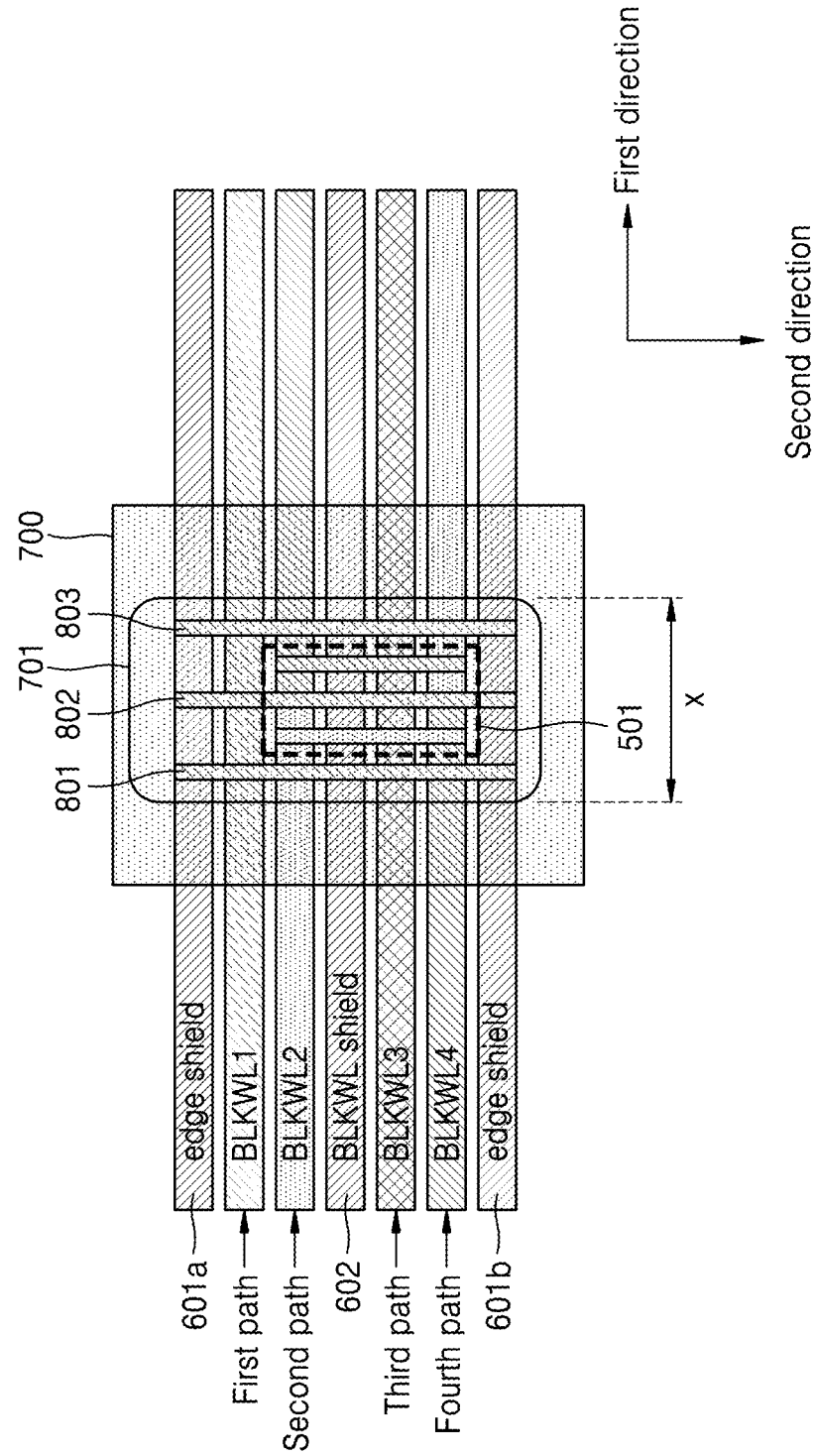
FIG. 7A illustrates a twist region of block select lines according to some embodiments.

FIG. 7A illustrates a twist region of block select lines BLKWL1 through BLKWL4 according to some embodiments. FIG. 7A may be described with reference to FIGS. 1 and 4A, and duplicate descriptions thereof may be omitted.

Referring to FIG. 7A, each of the block select lines BLKWL1 through BLKWL4 may extend in the first direction on the first layer. A path, on which the block select line BLKWL1 extends (before the path change in twist region 501), may be referred to as the first path. A path, on which the block select line BLKWL2 extends (before the path change in twist region 501), may be referred to as the second path. A path, on which the block select line BLKWL3 extends (before the path change in twist region 501), may be referred to as the third path. A path, on which the block select line BLKWL4 extends (before the path change in twist region 501), may be referred to as the fourth path. In the twist region 501, the paths of the block select lines BLKWL1 through BLKWL4 may be changed.

The first metal line 700 may extend in the second direction on the second layer. The first metal line 700 may include a metal wiring having a wide width. The second layer may be positioned above the first layer. The second direction may be different from the first direction. For example, the second direction (e.g., a Y-direction) may intersect (e.g., perpendicular to) the first direction (e.g., a X-direction). The vertical direction (e.g., the Z-direction) may be perpendicular to the first direction (e.g., the X-direction) and the second direction (e.g., the Y-direction).

The first metal line 700 may include the hole 701. The twist region 501 may be disposed in the hole 701 of the first metal line 700 on the second layer in a plan view. The length of the twist region 501 in the first direction may be less than a first direction length x of the hole 701 of the first metal line 700.

The memory device 100 may include shields 801, 802, and 803 which block the coupling between the first metal line 700 and the twist region 501. The shields 801, 802, and 803 may be disposed in the hole 701 of the first metal line 700 in a plan view. The shields 801, 802, and 803 may have a shape extending in the second direction like the first metal line 700. However, the number and shape of the shields 801, 802, and 803 may vary, and are not limited to the embodiment of FIG. 7A.

Figure 7B:
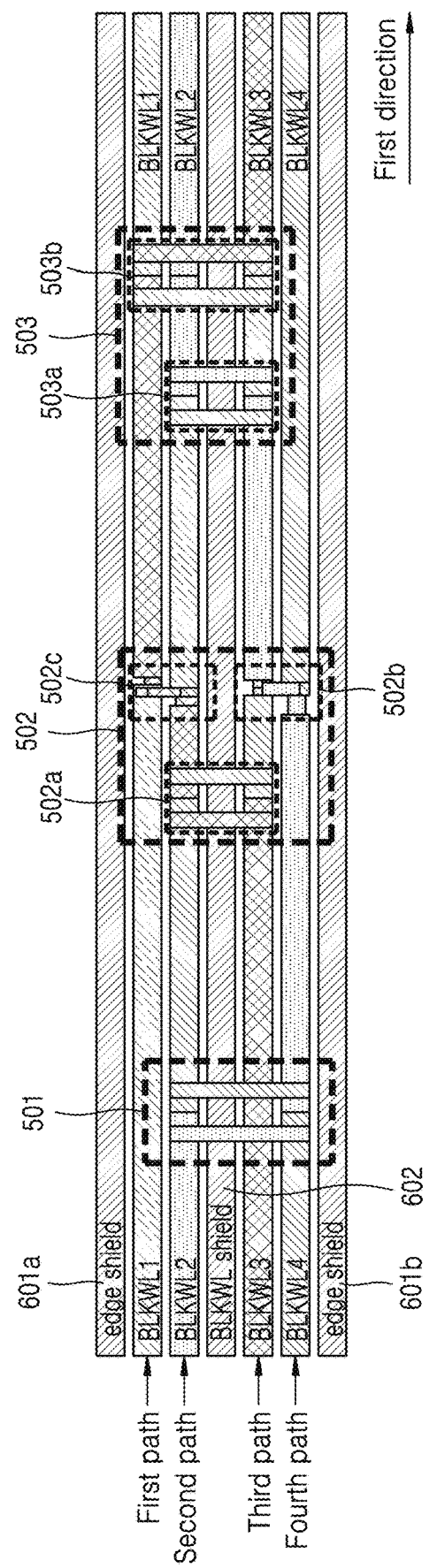
FIG. 7B illustrates twist regions of block select lines according to some embodiments.

FIG. 7B illustrates twist regions 501, 502, and 503 of the block select lines BLKWL1 through BLKWL4 according to some embodiments. FIG. 7B may be described with reference to FIGS. 4A and 7A, and duplicate descriptions thereof may be omitted.

Referring to FIG. 7B, the twist region 502 may include a plurality of twists 502a, 502b, and 503c. The twist 502a may change the wiring, extending on the second path, to extend on the third path, and the wiring, extending on the third path, to extend on the second path. The twist 502b may change the wiring, extending on the fourth path, to extend on the third path, and the wiring, extending on the third path, to extend on the fourth path. The twist 502c may change the wiring, extending on the first path, to extend on the second path, and the wiring, extending on the second path, to extend on the first path. In this manner, the twist region 502 may change the paths of the plurality of block select lines BLKWL1 through BLKWL4 via the plurality of twists 502a, 502b, and 502c.

The twist region 503 may include two twists 503a and 503b. The twist 503a may change the wiring, extending on the second path, to extend on the third path, and the wiring, extending on the third path, to extend on the second path. The twist 503b may change the wiring, extending on the first path, to extend from the third path, and the wiring, extending on the third path, to extend on the first path.

Figure 8:
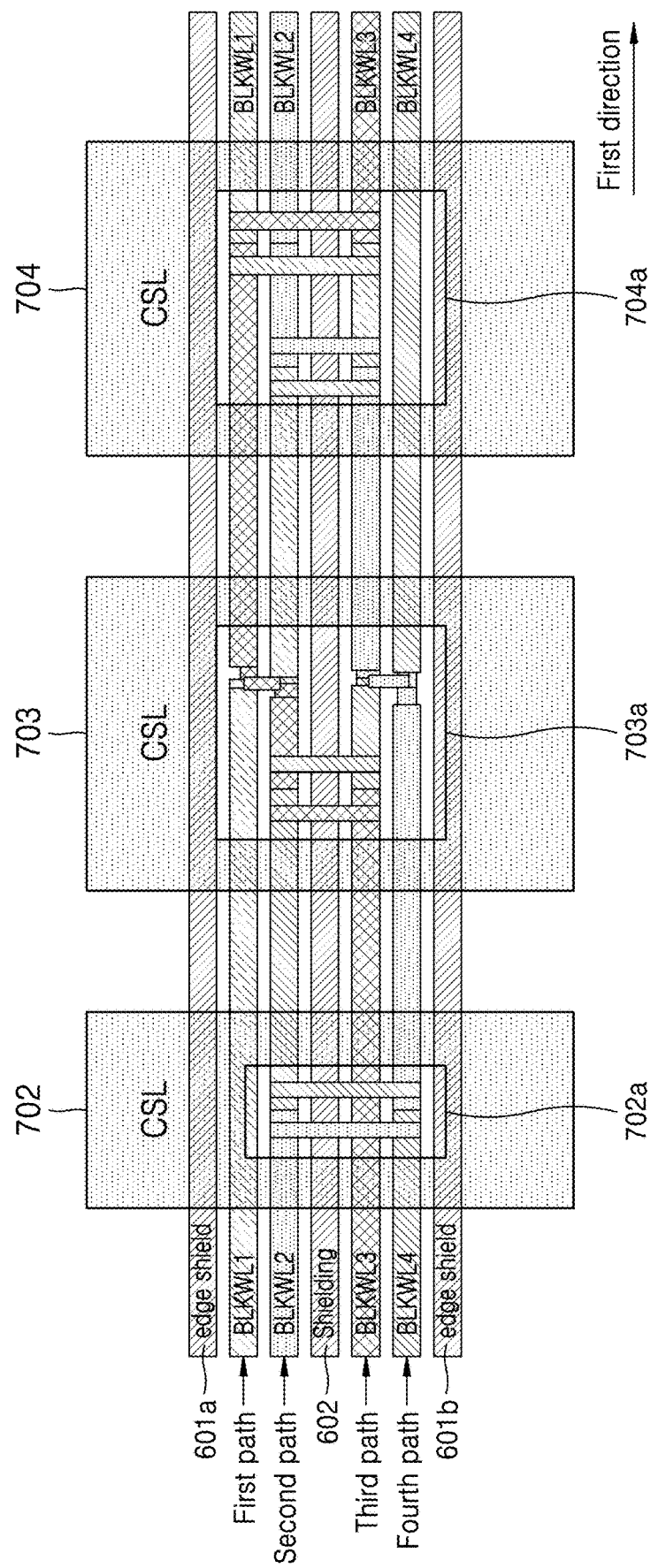
FIG. 8 illustrates twist regions according to some embodiments.

FIG. 8 illustrates twist regions according to some embodiments. FIG. 8 may be described with reference to FIGS. 4A, 7A, and 7B, and duplicate descriptions thereof may be omitted.

Referring to FIG. 8, CSLs 702, 703, and 704 may extend in the second direction on the second layer. For example, the first metal line 700 in FIG. 7A may include the CSLs 702, 703, and 704. The CSL 702 may include a hole 702a, the CSL 703 may include a hole 703a, and the CSL 704 may include a hole 704a.

The twists of the block select lines BLKWL1 through BLKWL4 may be disposed in the holes 702a, 703a, and 704a of the CSLs 702, 703, and 704 in a plan view, respectively. The holes 702a, 703a, and 704a of the CSLs 702, 703, and 704 may be referred to as common source line tapping regions, respectively. As the twists of the block select lines BLKWL1 through BLKWL4 are disposed in the common source line tapping region, the memory device 100 may not need an additional area for the twists of the block select lines BLKWL1 through BLKWL4.

Figure 9:
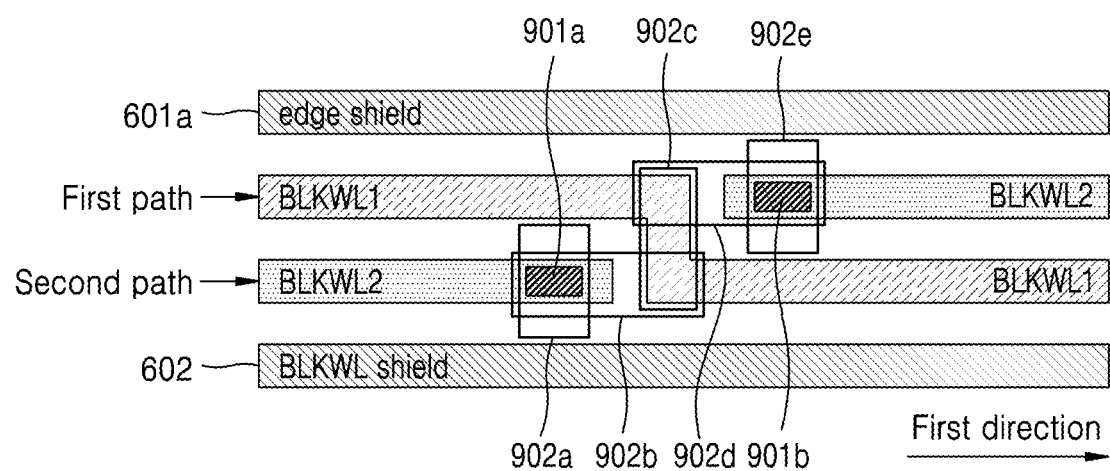
FIG. 9 illustrates a layout of block select lines according to some embodiments.

FIG. 9 illustrates a layout of the block select lines BLKWL1 and BLKWL2 according to some embodiments. FIG. 9 illustrates a method of interchanging paths of two block select lines BLKWL1 and BLKWL2 (first and second block select lines BLKWL1 and BLKWL2) in the memory device 100. FIG. 9 may be described with reference to FIGS. 7A and 8, and duplicate descriptions thereof may be omitted.

Referring to FIG. 9, the block select lines BLKWL1 and BLKWL2 may extend in the first direction on the first layer. The paths of the block select lines BLKWL1 and BLKWL2 may be interchanged. A path, on which the first block select line BLKWL1 extends in the first direction before the interchange, may be referred to as a first path. For example, the first block select line BLKWL1 before the interchange and the second block select line BLKWL2 after the interchange may be on the first path. A path, on which the second block select line BLKWL2 extends in the first direction before the interchange, may be referred to as a second path. For example, the second block select line BLKWL2 before the interchange and the first block select line BLKWL1 after the interchange may be on the second path. In some embodiments, the path of the first block select line BLKWL1 may be changed from the first path to the second path on the first layer. In other words, the path of the first block select line BLKWL1 may change on the first layer. Because the path of the first block select line BLKWL1 is changed on the same layer (e.g., on the first layer), the first block select line BLKWL1 may be maintained (e.g., continuously extend) without being disconnected.

The second block select line BLKWL2 on the second path may be disconnected on the first layer, and may be connected to the second block select line BLKWL2 on the second layer via a contact 901a. The second layer may be on (above) the first layer. The block select line BLKWL2 of the second layer may include wiring segments 902a, 902b, 902c, 902d, and 902e of the second layer. The block select line BLKWL2 of the second layer may include the same metal as the first metal line 700. For example, the wiring segments 902a, 902b, 902c, 902d, and 902e of the second layer may include the same metal as the first metal line 700. For example, the block select line BLKWL2 of the second layer may include the same metal as the common source line CSL. The path of the block select line BLKWL2 may be changed from the second path to the first path on the second layer. In other words, the path of the block select line BLKWL2 may change on the second layer. The block select line BLKWL2 of the second layer (e.g., the wiring segments 902a, 902b, 902c, 902d, and 902e) may be connected to the block select line BLKWL2 of the first layer via a contact 901b so that the block select line BLKWL2 on the first layer extend in the first direction on the first path.

The block select line BLKWL2 of the second layer may include one metal wiring or may include a various number of wiring segments, but is not limited to the embodiment described above.

Figure 10:
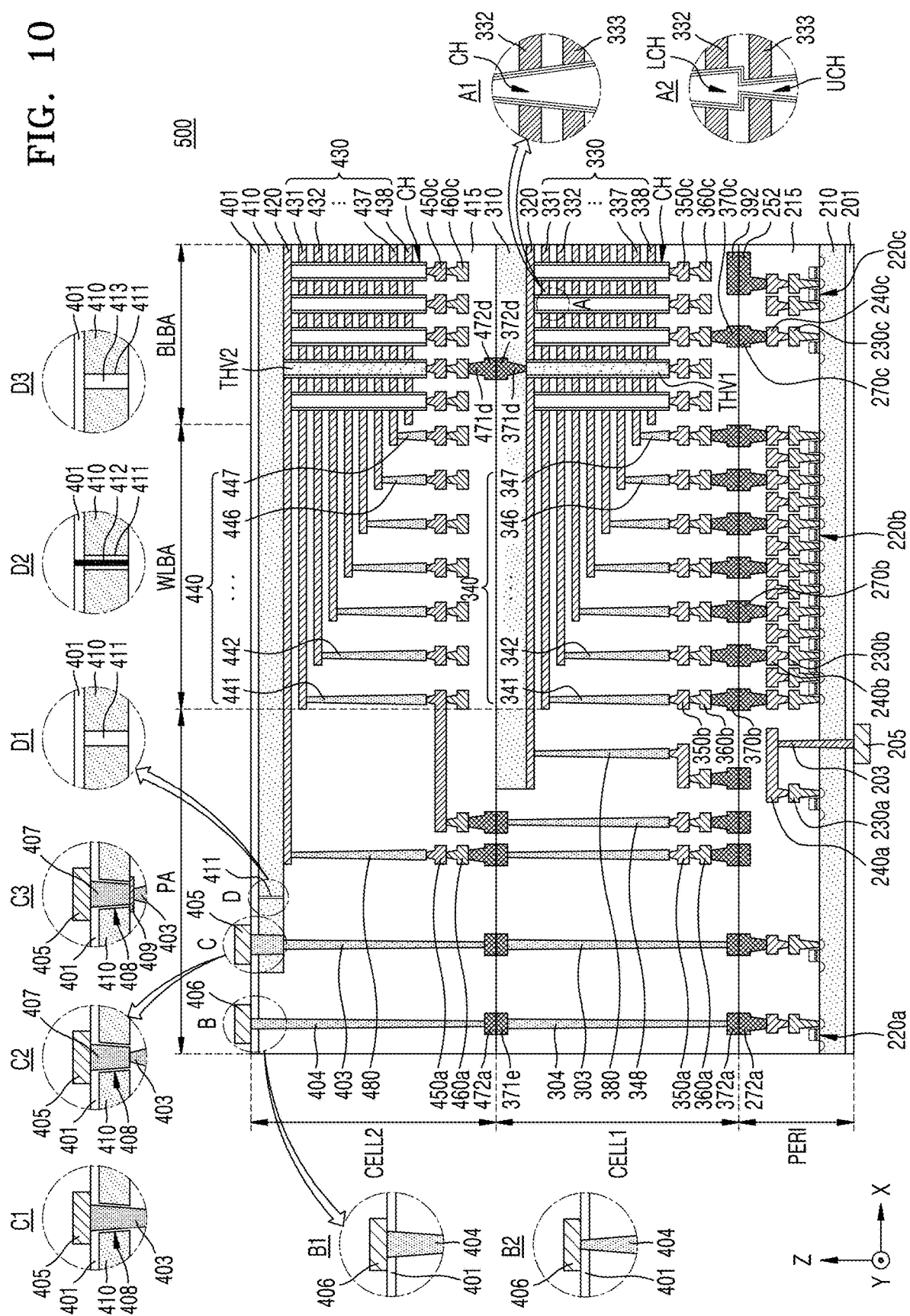
FIG. 10 is a diagram of a memory device according to some embodiments.

FIG. 10 is a diagram of a memory device 500 according to some embodiments.

Referring to FIG. 10, the memory device 500 may have a chip-to-chip (C2C) structure. At least one upper chip including a cell region (e.g., a first cell region CELL1 and/or a second cell region CELL2) and a lower chip including a periphery circuit region PER1 may be manufactured separately, and then, the at least one upper chip and the lower chip may be connected (e.g., electrically connected) to each other by using a bonding method to realize the C2C structure. For example, the bonding method may mean a method of electrically or physically connecting a bonding metal pattern formed on an uppermost metal layer of the upper chip to a bonding metal pattern formed on an uppermost metal layer of the lower chip. For example, when the bonding metal patterns include copper (Cu), the bonding method may include a Cu—Cu bonding method. In some embodiments, the bonding metal patterns may include, for example, aluminum (Al) and/or tungsten (W).

The memory device 500 may include the at least one upper chip including the cell region. For example, as illustrated in FIG. 10, the memory device 500 may include two upper chips. However, the number of upper chips is not limited thereto. When the memory device 500 includes the two upper chips, a first upper chip including a first cell region CELL1, a second upper chip including a second cell region CELL2, and the lower chip including the periphery circuit region PER1 may be manufactured separately, and the first upper chip, the second upper chip, and the lower chip may be connected (e.g., electrically connected) to each other by using the bonding method to manufacture the memory device 500. The first upper chip may be turned over and then may be connected (e.g., electrically connected) to the lower chip by using the bonding method, and the second upper chip may also be turned over and then may be connected (e.g., electrically connected) to the first upper chip by using the bonding method. Hereinafter, upper and lower portions of each of the first and second upper chips will be defined based on before each of the first and second upper chips is turned over. In other words, in FIG. 10, an upper portion of the lower chip may mean an upper portion defined based on a +Z-direction, and the upper portion of each of the first and second upper chips may mean an upper portion defined based on a −Z-direction. However, the embodiment is not limited thereto. In some embodiments, (only) one of the first upper chip and the second upper chip may be turned over and then, may be connected (e.g., electrically connected) to a corresponding chip by using the bonding method.

Each of the periphery circuit region PER1 and the first and second cell regions CELL1 and CELL2 of the memory device 500 may include an external pad bonding region PA, a word line bonding region WLBA, and a bit line bonding region BLBA.

The periphery circuit region PER1 may include a first substrate 210 and a plurality of circuit elements 220a, 220b, and 220c formed on/in the first substrate 210. An interlayer insulating layer 215 including one or more insulating layers may be provided on the plurality of circuit elements 220a, 220b, and 220c, and a plurality of metal lines electrically connected to the plurality of circuit elements 220a, 220b, and 220c may be provided in the interlayer insulating layer 215. For example, a plurality of metal lines may include first metal lines 230a, 230b, and 230c respectively connected (e.g., electrically connected) to the plurality of circuit elements 220a, 220b, and 220c, and second metal lines 240a, 240b and 240c respectively formed on the first metal lines 230a, 230b, and 230c. The plurality of metal lines may include a conductive material. For example, the first metal lines 230a, 230b, and 230c may include W having a relatively higher electrical resistivity, and the second metal lines 240a, 240b, and 240c may include Cu having a relatively lower electrical resistivity.

The first metal lines 230a, 230b, and 230c and the second metal lines 240a, 240b, and 240c are illustrated and described in the present embodiment. However, the embodiment is not limited thereto. In some embodiments, at least one metal line may further be formed on the second metal lines 240a, 240b, and 240c. In this case, the second metal lines 240a, 240b, and 240c may include, for example, Al, and at least some of the additional metal lines formed on the second metal lines 240a, 240b, and 240c may include, for example, Cu having an electrical resistivity lower than that of Al of the second metal lines 240a, 240b, and 240c.

The interlayer insulating layer 215 may be arranged on the first substrate 210, and may include, for example, an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 through 338) may be stacked on the second substrate 310 in a direction (that is, the +Z-direction). The plurality of word lines 330 may extend in parallel with an upper surface of the second substrate 310 (e.g., in the X-direction and/or the Y-direction). The string selection lines SSL and the ground selection line GSL may be arranged on and under the plurality of word lines 330, respectively, and the plurality of word lines 330 may be arranged between the string selection lines SSL and the ground selection line GSL. Similarly, the second cell region CELL2 may include a third substrate 410 and a common source line 420, and a plurality of word lines 430 (431 through 438) may be stacked on the third substrate 410 in a direction (that is, the +Z-direction). The plurality of word lines 430 may extend in parallel with an upper surface of the third substrate 410 (e.g., in the X-direction and/or the Y-direction). Each of the second substrate 310 and the third substrate 410 may include, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in region 'A1', which is an enlarged image of a region A, the channel structure CH may be provided in the bit line bonding region BLBA, and may extend in a direction perpendicular to the upper surface of the second substrate 310 (in the Z-direction) to extend in (e.g., penetrate) the plurality of word lines 330, the string selection lines SSL, and the ground selection line GSL. The channel structure CH may include a data storage layer, a channel layer, and a buried insulating layer. The channel layer may be electrically connected to a first metal line 350c and a second metal line 360c in the bit line bonding region BLBA. For example, the second metal line 360c may include the bit line BL, and may be connected (e.g., electrically connected) to the channel structure CH via the first metal line 350c. The second metal line 360c may extend in the second direction (e.g., the Y-direction) in parallel with the upper surface of the second substrate 310.

In some embodiments, as illustrated in region 'A2', which is another enlarged image of the region A, the channel structure CH may include a lower channel LCH and an upper channel UCH, which are connected to each other. For example, the channel structure CH may be formed by using a process of forming the lower channel LCH and a process of forming the upper channel UCH. The lower channel LCH may extend in a direction perpendicular to the upper surface of the second substrate 310 (e.g., the Z-direction) to extend in (e.g., penetrate) the common source line 320 and lower word lines, for example, the word lines 331 and 332 among the plurality of word lines 330. The lower channel LCH may include a data storage layer, a channel layer, and a buried insulating layer, and may be connected to the upper channel UCH. The upper channel UCH may extend in (e.g., penetrate) upper word lines, for example, the word lines 333 through 338 among the plurality of word lines 330 (in the Z-direction). The upper channel UCH may include a data storage layer, a channel layer, and a buried insulating layer, and the channel layer of the upper channel UCH may be electrically connected to the first metal line 350c and the second metal line 360c. As the length of a channel increases, due to characteristics of manufacturing processes, it may be difficult to form a channel having a substantially uniform width. The memory device 500 according to the present embodiment may include a channel having improved width uniformity due to the lower channel LCH and the upper channel UCH, which are formed by the using separately (e.g., sequentially) performed processes.

When the channel structure CH includes the lower channel LCH and the upper channel UCH as illustrated in the region 'A2', a word line adjacent to a boundary between the lower channel LCH and the upper channel UCH may include a dummy word line. For example, the word lines 332 and 333 adjacent to the boundary between the lower channel LCH and the upper channel UCH may include the dummy word lines. In this case, data may not be stored in memory cells MC connected to the dummy word lines. The number of pages corresponding to the memory cells MC connected to the dummy word line may be less than the number of pages corresponding to the memory cells MC connected to a general (non-dummy) word line. A level of the voltage applied to the dummy word line may be different from a level of the voltage applied to the general word line, and thus, it may be possible to reduce an influence of a non-uniform channel width between the lower and upper channels LCH and UCH in an operation of the memory device 500.

In some embodiments, the number of lower word lines 331 and 332 penetrated by the lower channel LCH may be less than the number of upper word lines 333 through 338 penetrated by the upper channel UCH in the region 'A2'. However, the embodiment is not limited thereto. In some embodiments, the number of lower word lines penetrated by the lower channel LCH may be equal to or greater than the number of upper word lines penetrated by the upper channel UCH. In addition, structural features and connection relation of the channel structure CH arranged in the second cell region CELL2 may be substantially the same as those of the channel structure CH arranged in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 10, the first through-electrode THV1 may extend in (e.g., penetrate) the common source line 320 and the plurality of word lines 330. In some embodiments, the first through-electrode THV1 may further extend in (e.g., at least partially penetrate) the second substrate 310. The first through-electrode THV1 may include a conductive material. In some embodiments, the first through-electrode THV1 may include a conductive material (at least partially) surrounded by an insulating material. The second through-electrode THV2 may have the same shape and structure as the first through-electrode THV1.

In some embodiments, the first through-electrode THV1 and the second through-electrode THV2 may be electrically connected to each other via a first through-metal pattern 372d and a second through-metal pattern 472d. The first through-metal pattern 372d may be formed at a lower end of the first upper chip including the first cell region CELL1, and the second through-metal pattern 472d may be formed at an upper end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected (e.g., electrically connected) to each other by using the bonding method.

In addition, in the bit line bonding region BLBA, an upper metal pattern 252 may be formed in an uppermost metal layer of the periphery circuit region PER1, and an upper metal pattern 392 having the same shape (substantially the same shape) as the upper metal pattern 252 may be formed in an uppermost metal layer of the first cell region CELL1. The upper metal pattern 392 of the first cell region CELL1 and the upper metal pattern 252 of the periphery circuit region PER1 may be electrically connected to each other by using the bonding method. In the bit line bonding region BLBA, the second metal line 360c may be electrically connected to a page buffer PB (e.g., the page buffer 150) included in the periphery circuit region PER1. For example, some of the circuit elements 220c of the periphery circuit region PER1 may constitute the page buffer PB, and the second metal line 360c may be electrically connected to the circuit elements 220c constituting the page buffer PB via an upper bonding metal pattern 370c of the first cell region CELL1 and an upper bonding metal pattern 270c of the periphery circuit region PER1.

Referring to FIG. 10 again, in the word line bonding region WLBA, the plurality of word lines 330 of the first cell region CELL1 may extend in the first direction (e.g., the X-direction) in parallel with the upper surface of the second substrate 310, and may be connected (e.g., electrically connected) to a plurality of cell contact plugs 340 (341 through 347). First metal lines 350b and second metal lines 360b may be sequentially connected onto the cell contact plugs 340 connected to the plurality of word lines 330. In the word line bonding region WLBA, the plurality of cell contact plugs 340 may be connected (e.g., electrically connected) to the periphery circuit region PER1 via upper bonding metal patterns 370b of the first cell region CELL1 and upper bonding metal patterns 270b of the periphery circuit region PER1.

The plurality of cell contact plugs 340 may be electrically connected to a row decoder (e.g., the row decoder 140) included in the periphery circuit region PER1. For example, some of the circuit elements 220b of the periphery circuit region PER1 may constitute the row decoder, and the plurality of cell contact plugs 340 may be electrically connected to the circuit elements 220b constituting the row decoder via the upper bonding metal patterns 370b of the first cell region CELL1 and the upper bonding metal patterns 270b of the periphery circuit region PER1. In some embodiments, an operating voltage of the circuit elements 220b constituting the row decoder may be different from an operating voltage of the circuit elements 220c constituting the page buffer PB (e.g., the page buffer 150). For example, the operating voltage of the circuit elements 220c constituting the page buffer PB may be greater than the operating voltage of the circuit elements 220b constituting the row decoder.

Similarly, in the word line bonding region WLBA, the plurality of word lines 430 of the second cell region CELL2 may extend in the first direction (e.g., the X-direction) in parallel with the upper surface of the third substrate 410, and may be connected (e.g., electrically connected) to a plurality of cell contact plugs 440 (441 through 447). The plurality of cell contact plugs 440 may be connected (e.g., electrically connected) to the periphery circuit region PER1 via an upper metal pattern of the second cell region CELL2, lower and upper metal patterns, and a cell contact plug 348 of the first cell region CELL1.

In the word line bonding region WLBA, the upper bonding metal patterns 370b may be formed in the first cell region CELL1, and the upper bonding metal patterns 270b may be formed in the periphery circuit region PER1. The upper bonding metal patterns 370b of the first cell region CELL1 and the upper bonding metal patterns 270b of the periphery circuit region PER1 may be electrically connected to each other by using the bonding method. The upper bonding metal patterns 370b and the upper bonding metal patterns 270b may include, for example, Al, Cu, and/or W.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected (e.g., electrically connected) to each other by using the bonding method in the external pad bonding region PA. Similarly, an upper metal pattern 372a may be formed in an upper portion of the first cell region CELL1, and an upper metal pattern 272a may be formed in an upper portion of the periphery circuit region PER1. The upper metal pattern 372a of the first cell region CELL1 and the upper metal pattern 272a of the periphery circuit region PER1 may be connected (e.g., electrically connected) to each other by using the bonding method.

Common source line contact plugs 380 and 480 may be arranged in the external pad bonding region PA. The common source line contact plugs 380 and 480 may include, for example, a conductive material, such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405, and 406 may be arranged in the external pad bonding region PA. Referring to FIG. 10, a lower insulating layer 201 may be on (e.g., cover) a lower surface of the first substrate 210, and a first input/output pad 205 may be formed on (a lower surface of) the lower insulating layer 201. The first input/output pad 205 may be connected (e.g., electrically connected) to at least one of a plurality of the circuit elements 220a arranged in the periphery circuit region PER1 via a first input/output contact plug 203, and may be separated from the first substrate 210 by the lower insulating layer 201. In addition, a side insulating layer may be arranged between the first input/output contact plug 203 and the first substrate 210 to electrically isolate (e.g., insulate) the first input/output contact plug 203 from the first substrate 210.

A lower insulating layer 401 may be formed on (e.g., covering) a lower surface of the third substrate 410. A second input/output pad 405 and/or a third input/output pad 406 may be arranged on the lower insulating layer 401. The second input/output pad 405 may be connected (e.g., electrically connected) to at least one of the plurality of circuit elements 220a arranged in the periphery circuit region PER1 via second input/output contact plugs 303 and 403, and the third input/output pad 406 may be connected (e.g., electrically connected) to at least one of the plurality of circuit elements 220a arranged in the periphery circuit region PER1 via third input/output contact plugs 304 and 404.

In some embodiments, the third substrate 410 may not be arranged in a region in which the input/output contact plug is arranged. For example, as illustrated in a region 'B', the third input/output contact plug 404 may be separated from the third substrate 410 in a direction in parallel with the upper surface of the third substrate 410 (e.g., in the X-direction), may extend in (e.g., penetrate) an interlayer insulating layer 415 of the second cell region CELL2, and may be connected (e.g., electrically connected) to the third input/output pad 406. In this case, the third input/output contact plug 404 may be formed by using at least one of various processes.

In some embodiments, as illustrated in a region 'B1', which is an enlarged image of the region 'B', the third input/output contact plug 404 may extend in a third direction (e.g., the Z-direction), and the diameter of the third input/output contact plug 404 may be gradually greater toward the lower insulating layer 401. In other words, the diameter of the channel structure CH described in the region 'A1' may be gradually less toward the lower insulating layer 401, but the diameter of the third input/output contact plug 404 may be gradually greater toward the lower insulating layer 401. For example, the third input/output contact plug 404 may be formed after the second cell region CELL2 and the first cell region CELL1 are bonded to each other by using the bonding method.

In some embodiments, as illustrated in a region 'B2', which is another enlarged image of the region 'B', the third input/output contact plug 404 may extend in the third direction (e.g., the Z-direction), and the diameter of the third input/output contact plug 404 may be gradually less toward the lower insulating layer 401. In other words, like the channel structure CH, the diameter of the third input/output contact plug 404 may be gradually less toward the lower insulating layer 401. For example, the third input/output contact plug 404 may be formed together with (e.g., by the same process as that of or the same series of processes as that of) the cell contact plugs 440 before the second cell region CELL2 and the first cell region CELL1 are bonded to each other.

In some embodiments, the second input/output contact plug 403 may overlap the third substrate 410 (in the Z-direction). For example, as illustrated in a region 'C', the second input/output contact plug 403 may extend in (e.g., penetrate) the interlayer insulating layer 415 of the second cell region CELL2 in the third direction (e.g., the Z-direction), and may be electrically connected to the second input/output pad 405. In this case, a connection structure between the second input/output contact plug 403 and the second input/output pad 405 may be realized by using various methods.

In some embodiments, as illustrated in a region 'C1', which is an enlarged image of the region 'C', an opening 408 may extend in (e.g., penetrate) the third substrate 410, and the second input/output contact plug 403 may be directly connected to the second input/output pad 405 through the opening 408 formed in the third substrate 410. In this case, as illustrated in the region 'C1', the diameter of the second input/output contact plug 403 may be gradually greater toward the second input/output pad 405. However, the embodiment is not limited thereto, and in some embodiments, the diameter of the second input/output contact plug 403 may be gradually less toward the second input/output pad 405.

In some embodiments, as illustrated in a region 'C2', which is another enlarged image of the region 'C', an opening 408 extending in (e.g., penetrating) the third substrate 410 may be formed, and a contact 407 may be formed in the opening 408. One end of the contact 407 may be connected to the second input/output pad 405, and another (e.g., opposite) end of the contact 407 may be connected to the second input/output contact plug 403. Accordingly, the second input/output contact plug 403 may be electrically connected to the second input/output pad 405 via the contact 407 in the opening 408. In this case, as illustrated in the region 'C2', the diameter of the contact 407 may be gradually greater toward the second input/output pad 405, and the diameter of the second input/output contact plug 403 may be gradually less toward the second input/output pad 405 (e.g., toward the contact 407). For example, the second input/output contact plug 403 may be formed together with (e.g., formed by the same process as that of or by the same series of processes as that of) the cell contact plugs 440 before the second cell region CELL2 and the first cell region CELL1 are bonded to each other, and the contact 407 may be formed after the second cell region CELL2 and the first cell region CELL1 are bonded to each other.

In some embodiments, as illustrated in the region 'C3', which is another enlarged image of the region 'C', a stopper 409 may further be formed on an upper end of the opening 408 of the third substrate 410, as compared to the embodiment of the region 'C2'. The stopper 409 may include a metal line formed on the same layer as the common source line 420. In some embodiments, the stopper 409 may include a metal line formed on the same layer as at least one of the plurality of word lines 430. The second input/output contact plug 403 may be electrically connected to the second input/output pad 405 through the contact 407 and the stopper 409.

Like the second and third input/output contact plugs 403 and 404 of the second cell region CELL2, the diameter of each of the second and third input/output contact plugs 303 and 304 of the first cell region CELL1 may be gradually less toward the lower metal pattern 371e, or may be gradually greater toward the lower metal pattern 371c.

In some embodiments, a slit 411 may be formed in the third substrate 410. For example, the slit 411 may be formed at a certain position of the external pad bonding region PA. For example, as illustrated in a region 'D', the slit 411 may be between the second input/output pad 405 and the plurality of cell contact plugs 440 in a plan view (e.g., in the X-direction). In some embodiments, the second input/output pad 405 may be between the slit 411 and the plurality of cell contact plugs 440 in a plan view (e.g., in the X-direction).

In some embodiments, as illustrated in a region 'D1', which is an enlarged image of the region 'D', the slit 411 may extend in (e.g., at least partially penetrate) the third substrate 410. For example, the slit 411 may prevent the third substrate 410 from being finely cracked when the opening 408 is formed. However, the embodiment is not limited thereto, and in some embodiments, the slit 411 may be formed to have the depth ranging from about 60% to about 70% of the thickness of the third substrate 410.

In some embodiments, as illustrated in a region 'D2', which is another enlarged image of the region 'D', a conductive material 412 may be formed in the slit 411. For example, the conductive material 412 may discharge to the outside a leakage current occurring while the circuit elements in the external pad bonding region PA are driven. In this case, the conductive material 412 may be connected (e.g., electrically connected) to an external ground line.

In some embodiments, as illustrated in a region 'D3', which is another enlarged image of the region 'D', an insulating material 413 may be formed in the slit 411. For example, the insulating material 413 may be used to electrically isolate (e.g., insulate) the second input/output pad 405 and the second input/output contact plug 403 arranged in the external pad bonding region PA from the word line bonding region WLBA. Because the insulating material 413 is formed in the slit 411, it may be possible to prevent a voltage provided via the second input/output pad 405 from affecting a metal layer on the third substrate 410 in the word line bonding region WLBA.

In some embodiments, the first, second, and third input/output pads 205, 405 and 406 may be selectively formed. For example, the memory device 500 may be implemented to include only the first input/output pad 205 on the first substrate 210, to include only the second input/output pad 405 on the third substrate 410, or to include only the third input/output pad 406 on the lower insulating layer 401.

In some embodiments, at least one of the second substrate 310 of the first cell region CELL1 and the third substrate 410 of the second cell region CELL2 may be used as a sacrificial substrate, and may be completely or partially removed before or after a bonding process. An additional layer may be stacked after the sacrificial substrate is removed. For example, the second substrate 310 of the first cell region CELL1 may be removed before or after the bonding process of the periphery circuit region PER1 and the first cell region CELL1, and then, an insulating layer on (e.g., covering) a lower surface of the common source line 320 or a conductive layer for connection may be formed. Similarly, the third substrate 410 of the second cell region CELL2 may be removed before or after the bonding process of the first cell region CELL1 and the second cell region CELL2, and then, the lower insulating layer 401 on (e.g., covering) a lower surface of the common source line 420 or a conductive layer for connection may be formed.

The memory cell array 110 of FIG. 1 may be disposed on the first cell region CELL1 and/or the second cell region CELL2. The peripheral circuit of FIG. 1 (e.g., the voltage generator 120, the control logic circuit 130, the row decoder 140, and/or the page buffer 150) may be disposed on the peripheral circuit region PER1.

While the inventive concept has been particularly shown and described with reference to embodiments thereof, it will be understood that various changes in form and details may be made therein without departing from the scope of the following claims.

What is claimed is:

1. A non-volatile memory device comprising:
a memory cell array;
a pass transistor circuit that is electrically connected to the memory cell array;
a block select line group that includes a plurality of block select lines, wherein the plurality of block select lines comprises a first block select line and a second block select line, each of which extends in a first direction on a first layer, and the block select line group is electrically connected to the pass transistor circuit; and
a first metal line that extends in a second direction on a second layer,
wherein the second layer is on the first layer,
wherein the first direction intersects the second direction, and
wherein at least one block select line among the plurality of block select lines includes at least one twist pattern that changes a path of the at least one block select line in a hole of the first metal line in a plan view.

2. The non-volatile memory device of claim 1, wherein the block select line group extends in at least one of a first region that is adjacent to the pass transistor circuit and a second region that is adjacent to the memory cell array.

3. The non-volatile memory device of claim 1, wherein the first metal line comprises a common source line (CSL), and
wherein the CSL is electrically connected to the memory cell array.

4. The non-volatile memory device of claim 1,
wherein the at least one twist pattern changes a path of the first block select line from a first path to a second path on the first layer and changes a path of the second block select line from the second path to the first path on the second layer,
wherein the at least one twist pattern includes a first portion of the second block select line that extends on the second layer, and
wherein the first portion of the second block select line includes a same material as the first metal line on the second layer.

5. The non-volatile memory device of claim 1, further comprising a shield that is configured to reduce coupling between the first metal line and the at least one twist pattern.

6. The non-volatile memory device of claim 1,
wherein the block select line group further comprises a third block select line that extends in the first direction,
wherein the second block select line is between the first block select line and the third block select line,
wherein the at least one twist pattern changes a path of the first block select line from a first path to a third path on the first layer and changes a path of the third block select line from the third path to the first path on the second layer,
wherein the at least one twist pattern includes a first portion of the third block select line that extends on the second layer, and
wherein the first portion of the third block select line includes a same material as the first metal line on the second layer.

7. The non-volatile memory device of claim 6, wherein a second portion of the second block select line and a third portion of the third block select line are adjacent to each other.

8. The non-volatile memory device of claim 6, further comprising:
a second metal line between the third block select line and the second block select line,
wherein the second metal line is configured to reduce coupling between the third block select line and the second block select line, and
wherein the second metal line extends in the first direction on the first layer.

9. A non-volatile memory device comprising:
a memory cell array that includes a plurality of memory blocks;
a pass transistor circuit that is electrically connected to the plurality of memory blocks;
a block decoder that is configured to provide a block select signal to the pass transistor circuit via a block select line group that includes a plurality of block select lines, wherein the plurality of block select lines comprises a first block select line and a second block select line, each of which extends in a first direction on a first layer;
a control logic circuit that is configured to control the memory cell array and the block decoder; and
a first metal line that extends in a second direction on a second layer,
wherein the second layer is on the first layer,
wherein the first direction intersects the second direction,
wherein at least one block select line among the plurality of block select lines includes at least one twist pattern that changes a path of the at least one block select line in a hole of the first metal line in a plan view, and
wherein a first portion of the first block select line and a second portion of the second block select line are adjacent to each other.

10. The non-volatile memory device of claim 9, wherein the block select line group passes through a first region that is adjacent to the pass transistor circuit and/or a second region that is adjacent to the memory cell array.

11. The non-volatile memory device of claim 9, wherein the first metal line comprises a common source line (CSL), and
wherein the CSL is electrically connected to the plurality of memory blocks.

12. The non-volatile memory device of claim 9,
wherein the at least one twist pattern changes a path of the first block select line from a first path to a second path on the first layer and changes a path of the second block select line from the second path to the first path on the second layer,
wherein the at least one twist pattern includes a third portion of the second block select line that extends on the second layer, and
wherein the third portion of the second block select line includes a same metal as the first metal line on the second layer.

13. The non-volatile memory device of claim 9, further comprising a shield that is configured to reduce coupling between the first metal line and the at least one twist pattern on the second layer.

14. The non-volatile memory device of claim 9,
wherein the block select line group further comprises a third block select line that extends in the first direction, wherein the second block select line is between the first block select line and the third block select line, wherein the at least one twist pattern changes a path of the first block select line from a first path to a third path on the first layer and changes a path of the third block select line from the third path to the first path on the second layer, wherein the at least one twist pattern includes a third portion of the third block select line that extends on the second layer, and wherein the third portion of the third block select line include a same metal as the first metal line on the second layer.

15. The non-volatile memory device of claim 14, wherein the second portion of the second block select line and a fourth portion of the third block select line are adjacent to each other.

16. The non-volatile memory device of claim 14, further comprising
a second metal line between the third block select line and the second block select line,
wherein the second metal line is configured to reduce coupling between the third block select line and the second block select line, and
wherein the second metal line extends in the first direction on the first layer.

17. A non-volatile memory device comprising:
a memory cell array;
a pass transistor circuit that is electrically connected to the memory cell array;
a first block select line group that includes a first block select line and a second block select line, each of which extends in a first direction on a first layer; and
a second block select line group that includes a third block select line and a fourth block select line, each of which extends in the first direction on the first layer,
wherein the first block select line group and the second block select line group are electrically connected to the pass transistor circuit,
wherein at least one block select line among the first block select line group and the second block select line group includes at least one twist pattern that changes a path of the at least one block select line,
wherein a first portion of the first block select line and a second portion of the second block select line are adjacent to each other, and
wherein a third portion of the third block select line and a fourth portion of the fourth block select line are adjacent to each other.

18. The non-volatile memory device of claim 17, further comprising a common source line (CSL) that extends in a second direction on a second layer,
wherein the second layer is on the first layer,
wherein the first direction intersects the second direction, and
wherein the at least one twist pattern is in a hole of the CSL in a plan view.

19. The non-volatile memory device of claim 18,
wherein the at least one twist pattern changes a path of the first block select line from a first path to a fourth path on the first layer and changes a path of the fourth block select line from the fourth path to the first path on the second layer,
wherein the fourth block select line includes a same metal as the CSL, and
wherein a fifth portion of the first block select line group and a sixth portion of the second block select line group are adjacent to each other.

20. The non-volatile memory device of claim 17, wherein the first block select line group and the second block select line group pass through a first region of the pass transistor circuit and/or a second region of the memory cell array.

* * * * *